United States Patent [19]

Rosenlund

[11] Patent Number: 5,548,804
[45] Date of Patent: Aug. 20, 1996

[54] METHOD AND ARRANGEMENT FOR INCREASING THE CAPACITY IN A MOBILE TELEPHONE SYSTEM

[75] Inventor: Henrik Rosenlund, Haninge, Sweden

[73] Assignee: Televerket, Farsta, Sweden

[21] Appl. No.: 214,674

[22] Filed: Mar. 21, 1994

Related U.S. Application Data

[63] Continuation of Ser. No. 768,597, filed as PCT/SE91/00046, Jan. 23, 1991 published as WO91/11890, Aug. 8, 1991, abandoned.

[30] Foreign Application Priority Data

Feb. 2, 1990 [SE] Sweden .................................. 9000375

[51] Int. Cl.⁶ ........................................................ H04Q 7/20
[52] U.S. Cl. ............................ 455/33.1; 455/56.1; 379/59
[58] Field of Search ....................... 455/54.1, 54.2, 455/56.1, 33.1, 33.2, 33.4, 53.1, 33.3, 49.1; 379/59, 60, 63

[56] References Cited

U.S. PATENT DOCUMENTS

| | | | |
|---|---|---|---|
| 4,383,332 | 5/1983 | Glance et al. ...................... | 455/33.1 |
| 4,398,063 | 8/1983 | Hass et al. . | |
| 4,669,107 | 5/1987 | Eriksson-Lennartsson ........... | 455/56.1 |
| 4,670,899 | 6/1987 | Brody et al. .......................... | 379/59 |
| 4,775,999 | 10/1988 | Williams . | |
| 5,101,500 | 3/1992 | Marui ................................... | 455/56.1 |
| 5,210,787 | 5/1993 | Hayes et al. .......................... | 379/59 |
| 5,291,544 | 3/1994 | Hecker ................................... | 379/60 |
| 5,337,344 | 8/1994 | Alvesalo .............................. | 379/59 |
| 5,381,464 | 1/1995 | O'Keefe et al. ..................... | 379/59 |
| 5,400,390 | 3/1995 | Salin ..................................... | 379/59 |

FOREIGN PATENT DOCUMENTS 0442617  8/1991  European Pat. Off. ............. 455/33.1

OTHER PUBLICATIONS

Billstrom, IEEE, Mobile Telephone Functions in AXE, 8–12 Jun. 1980, pp. 19.3.1–19.3.5.

*Primary Examiner*—Andrew Faile
*Assistant Examiner*—Nguyen Vo
*Attorney, Agent, or Firm*—Oblon, Spivak, McClelland, Maier & Neustadt, P.C.

[57] ABSTRACT

Method and arrangement for increasing the capacity in a mobile telephone system having mobile telephone exchanges (MTX), base stations (BS) and mobile stations (MS). The MTX:s handle the traffic within their traffic area via the base stations. MS:s mobile stations being at home are registered in a home location register and MS.S visiting the area are registered in a visitor location register. When the home location register is filled up, the system capacity is increased by selective MTX as home exchange, so that the MS is registered as visiting the visitor location register. MTX A, MTX B is preferably used as home exchange which only handles its home location register and associated functions, the radio traffic being handled via another MTX C which only handles its visitor location register and associated functions.

6 Claims, 1 Drawing Sheet

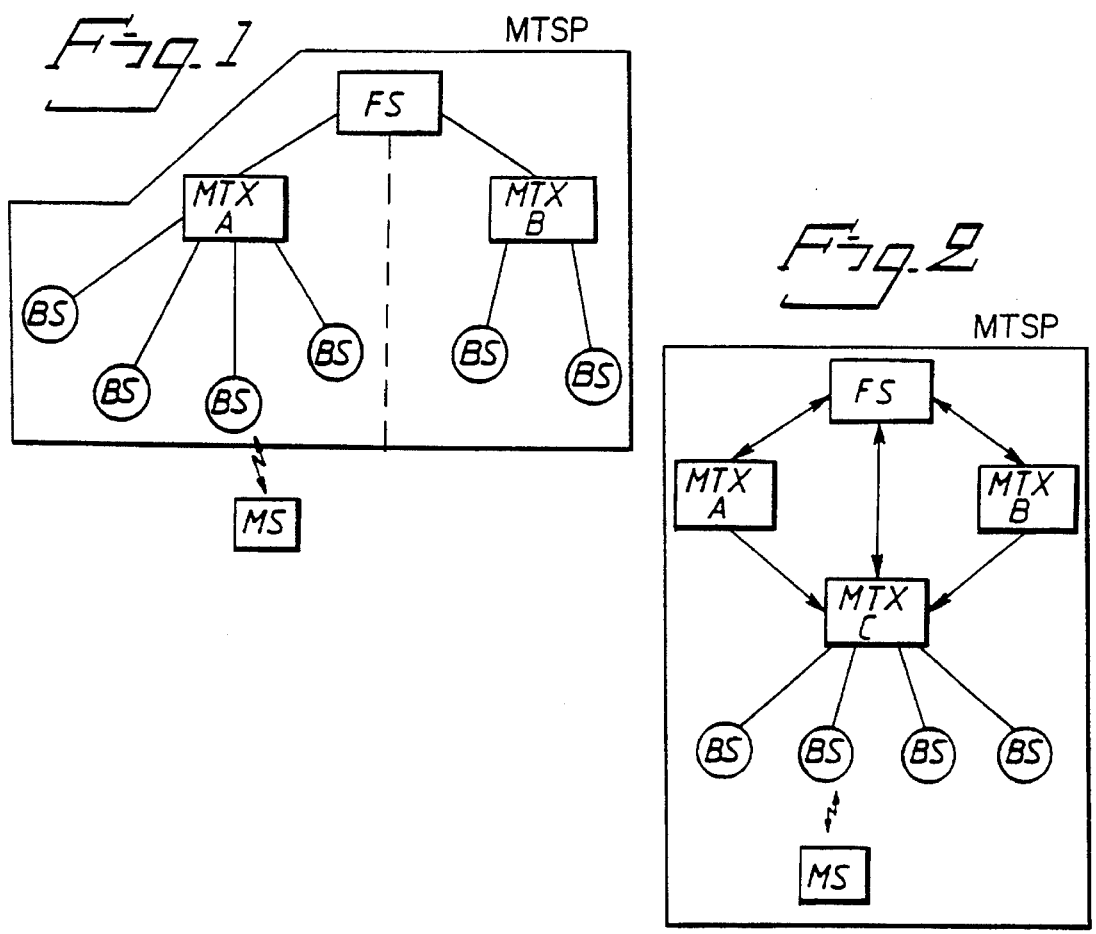
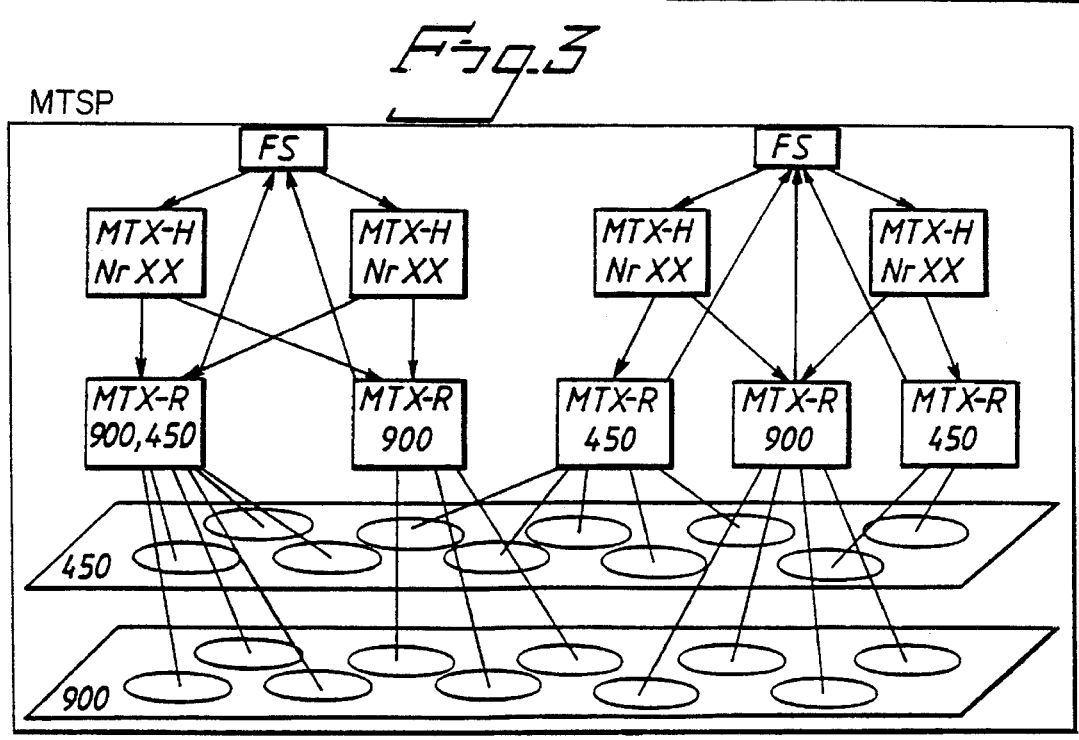

METHOD AND ARRANGEMENT FOR INCREASING THE CAPACITY IN A MOBILE TELEPHONE SYSTEM

This application is a Continuation of application Ser. No. 07/768,597, filed as PCT/SE91/00046, Jan. 23, 1991 published as WO91/11890, Aug. 8, 1991, now abandoned.

FIELD OF THE INVENTION

The present invention relates to a method and an arrangement for increasing the capacity in a mobile telephone system, particularly the NMT system (Nordisk Mobiltelefon).

PRIOR ART

The NMT system is a mobile telephone service provider that is built up of three main components: the mobile telephone exchanges, the base stations and the mobile stations. The mobile telephone exchanges (MTX) form the brain of the system and carry out the setting up of connections in the system with the aid of different registers. The exchanges form the interface between the NMT system and the switching stations (FS) of the fixed telephone network. The base stations (BS) are switching links without exchange function between the wire-conducted call transmission and the radio transmission. The mobile stations (MS) are the mobile subscriber sets which are found in different models, for example incar or portable stations or coin-operated units. See FIG. 1.

The country is divided into a number of traffic areas. In a traffic area, a number of base stations are distributed. Each traffic area belongs to one and only one exchange. This implies that all base stations in the traffic area are connected to this exchange and that all traffic within the area is channelled via the exchange. Each mobile subscriber is registered in a home location register in the exchange which controls the traffic in the traffic area in which the subscriber is normally located.

A problem is that the number of mobile subscribers in certain traffic areas, particularly metropolitan areas, continues to increase and thus the capacity in a mobile telephone exchange is not sufficient for moving the traffic in the system. With the introduction of several mobile telephone exchanges as traffic processing elements, the situation according to FIG. 1 is obtained. The area is divided into several traffic areas between the exchanges. A negative consequence of this is interruption during calls in a high-traffic area when mobiles pass the exchange boundaries since there is not yet any handover between exchanges. The reason for the traffic area to be divided is that the processors in the exchanges become overloaded and cannot handle the traffic and that limits in the subscriber number register result in a lack of numbers. A mobile telephone exchange can handle approximately 50,000 subscriber numbers but only traffic for approximately 28,000 subscribers since it manages at the same time traffic, home location registers, subscriber numbers, visitor location registers and subscriber services. In the visitor location registers, the mobile stations are registered which are located in the traffic area of the exchange but which geographically are at home in another traffic area and are thus registered in a home location register in another mobile telephone exchange. For the exchange to be able to operate without problems, the visitors must not exceed approximately 20% of the home subscribers.

SUMMARY OF THE INVENTION

Instead, the following method for increasing the capacity in the mobile telephone system is proposed according to the invention.

According to a first aspect of the invention, the subscribers are broken out of their "home exchange", that is to say the mobile telephone exchange which handles the traffic where the subscriber is geographically at home. Instead, a mobile telephone exchange is selected as home exchange which has a lower loading than the mobile telephone exchange which is controlling the traffic in the area where the mobile station is geographically at home so that the mobile station is registered as visiting in the visitor location register of the last-mentioned mobile telephone exchange when the mobile station is located within its traffic area. Since the visitor location register only needs to accommodate subscribers which are active, resources in the last-mentioned mobile telephone exchange are freed for managing subscriber registers and traffic.

According to another aspect of the present invention, a mobile telephone exchange is used as home exchange which only handles its home location register and functions associated therewith. The radio traffic is handled via another mobile telephone exchange which is only handling its visitor location register and associated functions. By distributing the functions of a mobile telephone exchange over two or more mobile telephone exchanges, resources for handling both the radio traffic and subscriber services are released, which most affect the fixed telephone network.

The invention also provides the advantage that a mobile telephone exchange can be allowed to handle radio traffic for more subscribers and/or an increase of the number of base stations without handover between mobile telephone exchanges needing to be implemented. Nor does a separate home location register have to be constructed but existing mobile telephone exchanges can be used directly by only changing the manner of application.

SHORT DESCRIPTION OF THE DRAWINGS

The present invention will now be described in detail with reference to the attached drawings, in which FIG. 1 is a diagram of a present mobile telephone network which can be modified in accordance with the first aspect of the invention;

FIG. 2 is a diagram of a mobile telephone network modified according to the second aspect of the invention; and FIG. 3 is a diagram of a mobile telephone network with two exchange levels according to the invention.

DETAILED DESCRIPTION OF PREFERRED EMBODIMENTS OF THE INVENTION

FIG. 1 diagrammatically describes the construction of the NMT system, a mobile telephone service provider (MTSP), with switching stations FS, mobile telephone exchanges MTXA and MTXB and, base stations BS and mobile stations MS connected by radio to the MTSP. The present invention affects the operation and organisation of the mobile telephone exchange. A mobile telephone exchange generally consists of a telephone exchange of the AXE type which has been supplemented with a part-system for the mobile telephone functions consisting of both hardware and software.

The mobile telephone exchange is the brain of the system which regulates the signalling which occurs between the different parts of the system, for example MTX to MS: setting up and clearing calls, switching on-going calls, updating home location registers and visitor location registers, requesting a power change; MTX to BS: remote control of the base station, transferring alarm signals; MTX to MTX: updating the subscriber registers and visitor location registers, forwarding of a call to the roaming subscriber; MTX to FS: call set-up.

The mobile telephone exchange also supplies the same services which exist for the subscribers of the telephone network, for example telephone watch, call forwarding, conference telephone among others. The mobile telephone exchange also handles the debiting of the mobile subscribers.

Setting-up a call in the NMT system occurs as follows. A call from a subscriber in the fixed telephone network is coupled, guided by the number of the mobile subscriber, to the home exchange of the subscriber. This stores information on the current position of the mobile subscriber and sends out a call via all base stations in the traffic area in which the mobile subscriber is located. The mobile station automatically responds with a call acknowledgement whereupon the mobile telephone exchange allocates a traffic channel to the mobile station. The call is set up. If the mobile station is located in a traffic area which does not belong to its home exchange, the home exchange switches the call from the subscriber in the fixed telephone network to the exchange which is handling the traffic in the visited traffic area and this latter exchange carries out the rest of the search and setting-up.

The special function which provides that a mobile subscriber can be called up without needing to know where the car subscriber is is called "roaming". Roaming is made possible by the fact that a mobile station which is leaving a traffic area and is entering a new one automatically tells the mobile telephone exchange that it has entered the new traffic area. The information on each mobile station is stored in the home exchange of the subscriber and is used for directing the call to the right traffic area. At the same time, the roaming subscriber is registered in the so-called visitor location register of the visited mobile telephone exchange. The visitor location register has a capacity which is approximately 20% of the total number of subscribers which are controlled by the exchange. When the visitor location register is full and a new visiting subscriber registers, earlier subscribers are deleted in the register mainly in accordance with the principle that a least recently active subscriber is deleted.

Further information on the NMT system can be ordered from Televerket. An article about the NMT system has also been published in the journal TELE No. 1, 1983, pages 57–67.

As has been mentioned earlier, a mobile telephone exchange can handle approximately 50,000 subscriber numbers, that is to say there is room for approximately 50,000 subscribers in the home location register. When an exchange is beginning to become full, the capacity must be increased. Introducing several mobile telephone exchanges produces the situation according to FIG. 1. The problem is that an interruption occurs in the call if a mobile station passes across the boundary between the traffic areas of two exchanges since there is not yet any handover between exchanges.

According to a first aspect of the invention, instead of introducing several mobile telephone exchanges, an existing exchange MTX B in a neighbouring traffic area with lower loading is utilised for registering the new subscribers MS. The exchange MTX B with the lower load is also used as home exchange even though the new mobile subscribers MS are geographically at home in another traffic area, in FIG. 1 to the left of the dotted line. The mobile subscribers MS are then registered as visiting in the mobile telephone exchange MTX A when they actually should have been registered in the home location register. This mobile telephone exchange MTX A is only loaded in the visitor location register to the extent to which the mobile stations MS are active.

According to a second aspect of the present invention, a network structure is proposed which is shown in FIG. 2. The two mobile telephone exchanges MTX A and MTX B here only handle their home location registers and subscriber data and are "home exchanges" for a large number of subscribers without servicing any base stations BS. A third mobile telephone exchange MTX C manages all traffic to and from the base stations and the subscribers are registered as visiting in MTX C which does not have any home subscribers. MTX A and MTX B can contain 50,000 subscribers, respectively. MTX C has a visitor location register for 20,000 subscribers since not all subscribers are active at the same time.

MTX A and MTX B each carry out the same work for their part of the set of subscribers. The home register, that is to say the complete entry of new subscriptions, is only established in these two. Many computer decisions and all call forwardings to the fixed network only affect MTX A and MTX B, respectively. All subscribers from this area which have roamed to another area or country are only serviced via MTX A or MTX B, respectively. All incoming calls are "filtered" by MTX A and MTX B, respectively, and the subscribers which are home and open are forwarded on to MTX C which handles the radio traffic and sends out calls in the right traffic area.

MTX C only handles the radio traffic to and from the mobile stations. Incoming calls come from MTX A or MTX B or another MTX for other visitors and are transmitted over the traffic area where the subscriber is located. All calls incoming from the mobile stations MS go directly to the fixed network via a switching station FS. All roaming calls occur as usual in the direction of the home exchange. As a result, MTX C only operates with telephony traffic and can thus handle more traffic. Due to the above distribution, instead of two exchanges being allowed to attend to everything alike, the work is distributed between them so that it is not necessary to resort to an exchange boundary in metropolitan regions.

With a division according to the above, MTX can only have a limited number of visitors. If all the memory in the exchange is blocked for visitors, they should be approximately 20,000, that is to say a considerable increase. When a new visitor creates a visiting call or normal call, the oldest subscriber in the visitor location register, that is to say the subscriber with the least recent traffic, will be deleted in the register. This has only marginal consequence for him because his visiting information remains in the home exchange. In the case of traffic to him, he must be called over the whole coverage area of the visited exchange if no further information on the traffic area is found in the home exchange. With traffic from the mobile stations, the call is allowed to pass but MTX C then does not know its category without collecting this at MTX A or MTX B. As soon as updating has taken place, the necessary measures can be undertaken.

Due to the fact that the radio traffic is handled by a separate exchange, several networks having different frequencies can be coupled together, for example NMT 450 and NMT 900. In this manner, a mobile telephone exchange network is built up for roaming and calling together with a traffic-processing mobile telephone exchange network which handles base stations. The latter exchanges can handle either 900-type or 450-type base stations depending on the capacity and traffic or be enhanced 900-type or 450-type exchanges. In this manner, the radio network in different traffic areas and exchange boundaries only becomes dependent on the size of the traffic, that is to say how much radio traffic an exchange can carry. The distribution of numbers becomes freer and no particular numerical boundary between 900-type subscription and 450-type subscription needs to be found but is only determined by the roaming subscribers and the size of the number in the respective exchange.

Such a network is described in FIG. 3 where the mobile telephone exchange functions are divided into two levels. At the top level, MTX-H, the home location register for roaming and calls is also handled. At the lower level, MTX-R, the radio traffic to the radio system is handled with different frequencies 450 and 900, respectively.

I claim:

1. A method of expanding the number of mobile hosts that a Mobile Telephone Exchange (MTX) can handle, comprising the steps of:

storing information about plural mobile stations in a first home register of a first MTX, the first MTX belonging to a coverage area of a mobile telephone service provider and the first MTX handling radio traffic from plural base stations in the coverage area;

subscribing a new mobile station to the mobile telephone service provider for the coverage area serviced by the first MTX;

determining, at the mobile telephone service provider, a second MTX with a second home register, the second home register storing information about fewer mobile stations than the first home register; and storing information about the new mobile station in the second home register of the second MTX determined in the determining step.

2. The method of claim 1, further comprising the steps of:

broadcasting identification information about the new mobile station from the new mobile station;

receiving the broadcasted identification information about the new mobile station at a third MTX, the third MTX having a visitor register;

requesting the stored information about the new mobile station from the second MTX; and transferring the requested information from the second home register to the visitor register of the third MTX.

3. The method of claim 1, further comprising the steps of:

broadcasting identification information about the new mobile station from the new mobile station;

receiving the broadcasted identification information about the new mobile station at the first MTX, the first MTX having a visitor register;

requesting the stored information about the new mobile station from the second MTX; and transferring the requested information from the second home register to the visitor register of the first MTX.

4. The method of claim 1, further comprising the steps of:

establishing a telephone call between the new mobile station and another party using the first MTX.

5. A method of expanding the number of mobile hosts that a Mobile Telephone Exchange (MTX) can handle, comprising the steps of:

storing information about plural mobile stations in a home register of a first MTX, the first MTX handling only home register information;

connecting a second MTX to the first MTX, the second MTX having a visitor register to handle visitor register information and having connections to plural base stations to handle radio traffic;

connecting the second MTX to a switching station;

broadcasting identification information about one of said mobile stations from the one of said plural mobile stations;

receiving the broadcasted identification information about the one of said plural mobile stations at the second MTX;

requesting the stored information about the one of said plural mobile stations from the home register; and transferring the requested information from the home register to the visitor register.

6. The method of claim 5, further comprising:

establishing a telephone call between the one of said mobile stations and another party using the second MTX; and transferring voice data of the telephone call directly between the second MTX and the switching stations.

* * * * *